United States Patent
Han et al.

(10) Patent No.: US 9,899,946 B2
(45) Date of Patent: Feb. 20, 2018

(54) SENSORLESS CONTROL OF SWITCHED RELUCTANCE MACHINES

(71) Applicant: Caterpillar Inc., Peoria, IL (US)

(72) Inventors: Seok-hee Han, Dunlap, IL (US); Jackson Wai, Dunlap, IL (US); Ahmed Khalil, Dunlap, IL (US); Ernesto Inoa, Dunlap, IL (US); Sangameshwar Sonth, Peoria, IL (US); Jesse Gerdes, Dunlap, IL (US); James Michael Thorne, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 95 days.

(21) Appl. No.: 15/040,795

(22) Filed: Feb. 10, 2016

(65) Prior Publication Data

US 2017/0229992 A1  Aug. 10, 2017

(51) Int. Cl.
*H02P 25/08* (2016.01)
*H02P 25/089* (2016.01)
*H02P 23/14* (2006.01)

(52) U.S. Cl.
CPC ............ *H02P 25/089* (2016.02); *H02P 23/14* (2013.01)

(58) Field of Classification Search
CPC ............................... H02P 25/089; H02P 23/14
USPC ...................................................... 318/254.1
See application file for complete search history.

(56) References Cited

U.S. PATENT DOCUMENTS

| | | | |
|---|---|---|---|
| 5,072,166 A | 12/1991 | Ehsani | |
| 6,801,012 B1 | 9/1998 | Soff et al. | |
| 5,864,217 A | 1/1999 | Lyons et al. | |
| 6,853,163 B2* | 2/2005 | Slater | H02P 25/089 318/700 |
| 6,897,591 B2* | 5/2005 | Peachee | H02K 1/148 310/166 |
| 6,979,974 B2* | 12/2005 | Slater | G01D 5/2013 318/701 |
| 8,723,462 B2 | 5/2014 | Jang | |
| 2011/0068724 A1* | 3/2011 | Henderson | H02P 6/18 318/400.21 |
| 2013/0249448 A1* | 9/2013 | Kobayashi | H02P 29/662 318/400.02 |
| 2014/0333240 A1* | 11/2014 | Kobayashi | H02P 29/662 318/400.02 |
| 2014/0340010 A1* | 11/2014 | Matsuura | H02P 21/141 318/400.13 |
| 2014/0375234 A1* | 12/2014 | Kim | H02P 6/08 318/400.02 |
| 2015/0084575 A1 | 3/2015 | Magee | |

* cited by examiner

*Primary Examiner* — Erick Glass
(74) *Attorney, Agent, or Firm* — Miller, Matthias & Hull; Steve D. Lundquist

(57) ABSTRACT

A control system for a switched reluctance (SR) machine having a rotor and a stator is provided. The control system may include a converter circuit in electrical communication between the stator and a common bus, and a controller configured to monitor a bus voltage of the converter circuit and a phase current of the SR machine. The controller may be configured to determine a phase voltage based on one or more of main pulses and any diagnostic pulses, determine an estimated flux based on the phase voltage and an associated mutual voltage, determine a rotor position based at least partially on the estimated flux, and control the SR machine based on the rotor position and a desired torque.

17 Claims, 3 Drawing Sheets

SENSORLESS CONTROL OF SWITCHED RELUCTANCE MACHINES

TECHNICAL FIELD

The present disclosure relates generally to switched reluctance machines, and more particularly, to sensorless systems and methods for controlling switched reluctance machines.

BACKGROUND

An electric machine such as an electrical motor, power generation system, genset, or the like, is generally used to convert one form of energy into another and may operate in a motoring mode to convert electrical input into rotational or otherwise mechanical output, or operate in a generating mode to convert rotational or otherwise mechanical input into electrical output. Among the various types of machines available for use with an electric drive, switched reluctance (SR) machines have received great interest for being robust and cost-effective. While currently existing systems and methods for controlling such electric machines may provide adequate control, there is still room for improvement.

Among other factors, proper determination of the position and speed of the rotor of the SR machine during relatively low speed operations may have significant impacts on overall performance and efficiency. Some conventional control schemes rely on mechanically aligned speed wheels and sensors to detect and determine the position of the rotor relative to the stator at machine standstill or low speed operations. However, such sensor-based control schemes typically require costly implementations and are susceptible to error. For instance, an error of 2 degrees in the detected mechanical rotor position of an SR machine, caused by a skewed sensor, a mechanical misalignment of the speed wheel, or the like, may correspond to a 0.5% decrease in efficiency of the electric drive assembly at full load.

Although sensorless solutions also exist, conventional sensorless control schemes must implement two or more distinct processes for different ranges of operating speeds or operating modes. For instance, a conventional control scheme for low speed operations, such as that of U.S. Pat. No. 5,525,886 to Lyons, et al., may inject current signals and refer to lookup maps to estimate the rotor position, while a conventional control scheme for high speed operations may apply observers to phase currents to emulate and determine the rotor position. Such a need to simultaneously operate between distinct processes depending on the speed or mode of operation can be inefficient, cumbersome and unnecessarily waste computational resources.

In addition, although the lookup tables or maps used during low speed processes can quickly output the rotor position based on injected current signals, the accuracy of the rotor position at the output is only as good as the quality of the current signal that is read at the input. More specifically, because lookup tables or maps are not capable of sufficiently filtering out noise or distinguishing errors induced by noise from the targeted signal, the rotor position ultimately output can be based on noise-induced errors and thus susceptible to inaccuracies. Furthermore, while conventional systems typically derive rotor speed based on the rotor position, derivations or calculations based on noisy rotor position information can further compound noise-induced errors, output even noisier rotor speed information, and adversely impact the overall performance of the associated SR machine.

Accordingly, there is a need to provide control schemes for controlling SR machines that are not only less costly and easier to implement, but also more efficiently performed without compromising overall reliability. Moreover, there is a need to provide a simplified control system or a single unified control scheme that can operate across wider ranges of operating speeds or operating modes of an SR machine and consume less of the computational resources allocated for use with the SR machine. There is also a need to provide a solution that is more reliable and robust to noise, all without requiring additional computational resources or proximity sensors. The systems and methods disclosed herein are directed at addressing one or more of the aforenoted needs.

SUMMARY OF THE DISCLOSURE

In one aspect of the present disclosure, a control system for a switched reluctance (SR) machine having a rotor and a stator is provided. The control system may include a converter circuit in electrical communication between the stator and a common bus, and a controller configured to monitor a bus voltage of the converter circuit and a phase current of the SR machine. The controller may include at least a phase voltage estimator module configured to determine a phase voltage based on one or more of main pulses and any diagnostic pulses, a flux estimator module configured to determine an estimated flux based on the phase voltage and an associated mutual voltage, a position observer module configured to determine a rotor position based at least partially on the estimated flux, and a main pulse control module configured to control the SR machine based on the rotor position and a desired torque.

In another aspect of the present disclosure, an electric drive is provided. The electric drive may include an SR machine having a stator and a rotor rotatably disposed relative to the stator, a converter circuit configured to electrically communicate with the stator and a common bus, and a controller in electrical communication with at least the converter circuit. The controller may be configured to monitor a bus voltage of the common bus and a phase current of the SR machine, receive main pulses and any diagnostic pulses, determine a phase voltage based on one of the main pulses and the diagnostic pulses, determine an estimated flux based on the phase voltage and an associated mutual voltage, engage a position observer to determine a rotor position based at least partially on the estimated flux, and control the SR machine based on the rotor position and a desired torque.

In yet another aspect of the present disclosure, a method for determining rotor position of an SR machine being operated through a converter circuit is provided. The method may include monitoring a bus voltage of the converter circuit and a phase current of the SR machine; receiving main pulses and any diagnostic pulses; determining a phase voltage based on one of the main pulses and the diagnostic pulses; determining an estimated flux based on the phase voltage and an associated mutual voltage; engaging a position observer to determine a rotor position of the SR machine based at least partially on the estimated flux; and controlling an output torque of the SR machine based on the rotor position and a desired torque.

DETAILED DESCRIPTION

Figure 1:
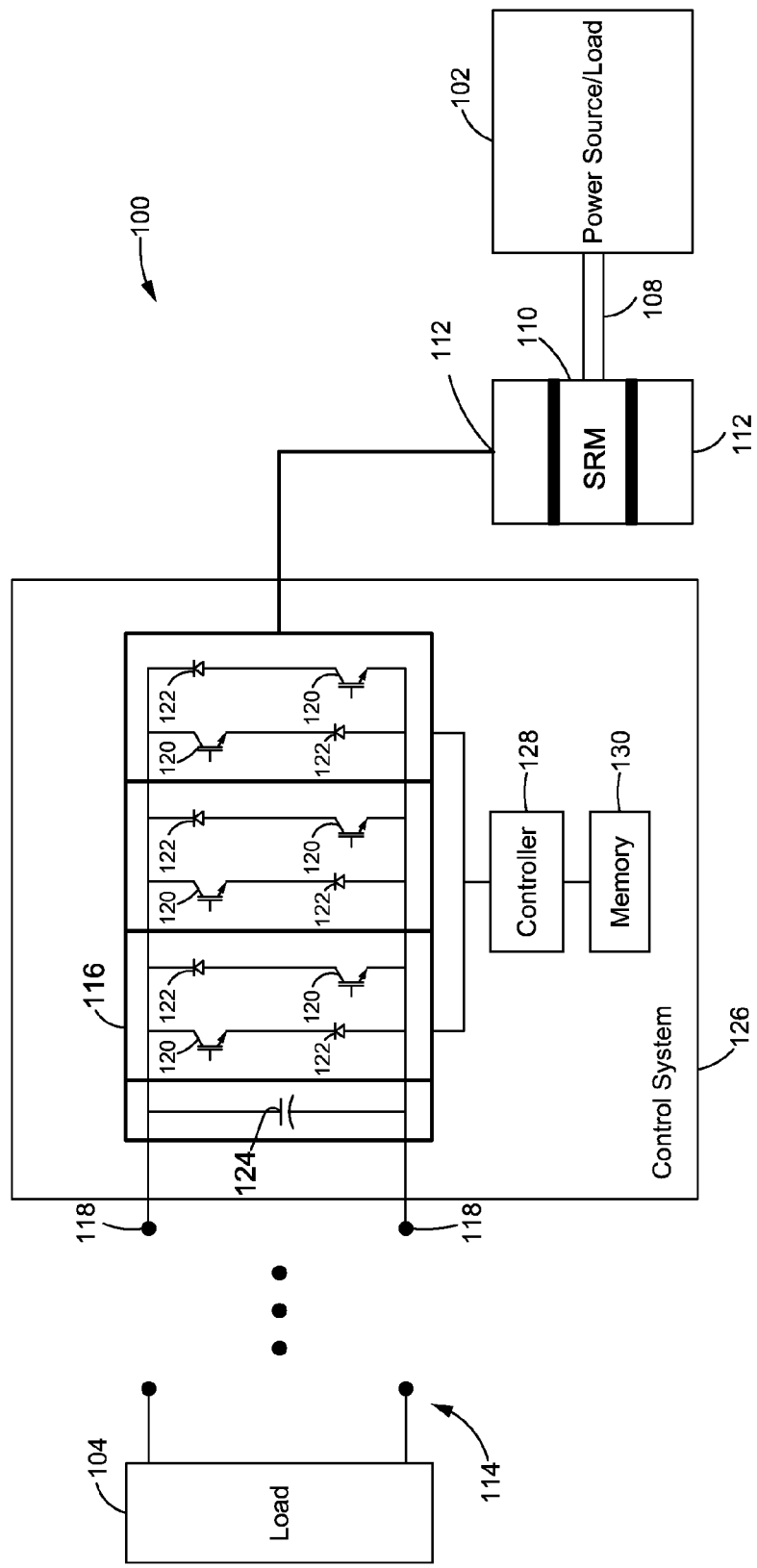
FIG. 1 is a schematic view of one exemplary embodiment of an electric drive with a control system for controlling a switched reluctance (SR) machine in accordance with the teachings of the present disclosure.

Referring to FIG. 1, one exemplary electric drive 100 that may be employed to communicate power between a primary power source 102 and one or more electrical loads 104 is schematically illustrated. The primary power source 102 may include a diesel engine, a gasoline engine, a natural gas engine, or any other source of mechanical or rotational energy commonly used in association with mobile tools, industrial machines, and the like. The primary power source 102 may alternatively include power sources commonly used in conjunction with stationary applications, such as windmills, hydro-electric dams, batteries, fuel cells, or any other suitable source of energy. The electrical loads 104 may include one or more devices or components which consume and/or employ electrical power provided thereto by the electric drive 100. For example, with respect to industrial work machines or mobile work vehicles, the electrical loads 104 may include one or more motors for operating tools of the machine and/or one or more traction motors for causing motion of the associated vehicle.

Mechanical energy that is supplied by the primary power source 102 may be converted into electrical power by the electric drive 100 for use by the connected electrical loads 104. Conversely, any electrical power that may be supplied by the electrical loads 104 and/or the electric drive 100 may be supplied to drive mechanical power to the primary power source 102. As shown in the particular embodiment of FIG. 1, for instance, the electric drive 100 may communicate with the primary power source 102 through a switched reluctance (SR) machine 106, or the like. As is well known in the art, the SR machine 106 may include a rotor 110 that is rotatably disposed within a fixed stator 112. The rotor 110 of the SR machine 106 may be rigidly and rotatably coupled to an output of the primary power source 102 via a coupling 108, or in other embodiments, via a direct crankshaft, a gear train, a hydraulic circuit, or the like. Each phase or phase winding of the stator 112 of the SR machine 106 may be electrically coupled to a common bus 114 of the electric drive 100 via a converter circuit 116.

During a generating mode of operation, as the rotor 110 of the SR machine 106 is rotated within the stator 112 by the primary power source 102, electrical current may be induced within the stator 112 and supplied to the converter circuit 116. The converter circuit 116 may in turn convert the electrical signals into the appropriate direct current (DC) voltage for distribution to the electrical load 104 and/or any other device via the common bus 114. The common bus 114 may provide terminals 118, such as positive and negative or ground lines, across which the common bus 114 may communicate a bus voltage or DC link voltage between one or more electrically parallel devices of the electric drive assembly 100. The electrical loads 104 may include circuitry for converting the DC voltage supplied by the converter circuit 116 into the appropriate electrical signals for operating any one or more devices associated with the electric drive 100. Additionally, during a motoring mode of operation, or when the electrical loads 104 become the sink of electrical power, the SR machine 106 may be enabled to cause rotation of the rotor 110 in response to electrical signals that are provided to the stator 112 from the common bus 114.

As shown in FIG. 1, the converter circuit 116 may include a series of transistors or gated switches 120 and diodes 122 for selectively enabling one or more phase windings or phases of the SR machine 106. A three-phase SR machine 106, for example, may be driven using a converter circuit 116 with six switches 120 and six diodes 122 for selectively enabling or disabling each of the three phases of the SR machine 106. Each of the switches 120 may further be enabled or disabled via gate signals while an external or secondary power source 124 provides power across the positive and negative lines 118 of the common bus 114 to force current through the respectively enabled switches 120 and diodes 122. The electric drive 100 may also be provided with an exemplary control system 126 configured to, among other things, determine the position of the rotor 110 of the SR machine 106 relative to the stator 112 and control operation of the SR machine 106 based on the determined rotor position.

As illustrated in FIG. 1, the control system 126 may generally include the converter circuit 116, at least one controller 128 in communication with the gated switches 120 of the converter circuit 116, as well as a memory 130 in communication with the controller 128 that is provided within and/or external to the controller 128. More particularly, the controller 128 may be electrically coupled to the switches 120 in a manner which enables the controller 128 to selectively engage the switches 120 and source current through the different phases of the SR machine 106, as well as in a manner which enables the controller 128 to monitor electrical characteristics of the SR machine 106 and the bus or DC link voltage of the common bus 114 during operation of the SR machine 106. The memory 130 may retrievably store one or more algorithms, machine data, predefined relationships between different machine parameters, preprogrammed models, such as in the form of lookup tables and/or maps, or any other information that may be accessed by the controller 128 and relevant to the operation of the SR machine 106.

The controller 128 of FIG. 1 may be implemented using one or more of a processor, a microprocessor, a microcontroller, a digital signal processor (DSP), a field-programmable gate array (FPGA), an electronic control module (ECM), an electronic control unit (ECU), or any other suitable means for electronically controlling functionality of the control system 126. The controller 128 may be configured to operate according to predetermined algorithms or sets of instructions for operating the electric drive 100 and the SR machine 106 based on the rotational speed and/or position of the rotor 110 relative to the stator 112 or other operating characteristics of the electric drive 100. Such algorithms or sets of instructions may be preprogrammed or incorporated into memory 130 that is associated with or at least accessible to the controller 128 as is commonly used in the art. Moreover, the algorithms or instructions implemented by the controller 128 may be categorized into modular arrangements such as that schematically shown for example in FIG. 2.

Figure 2:
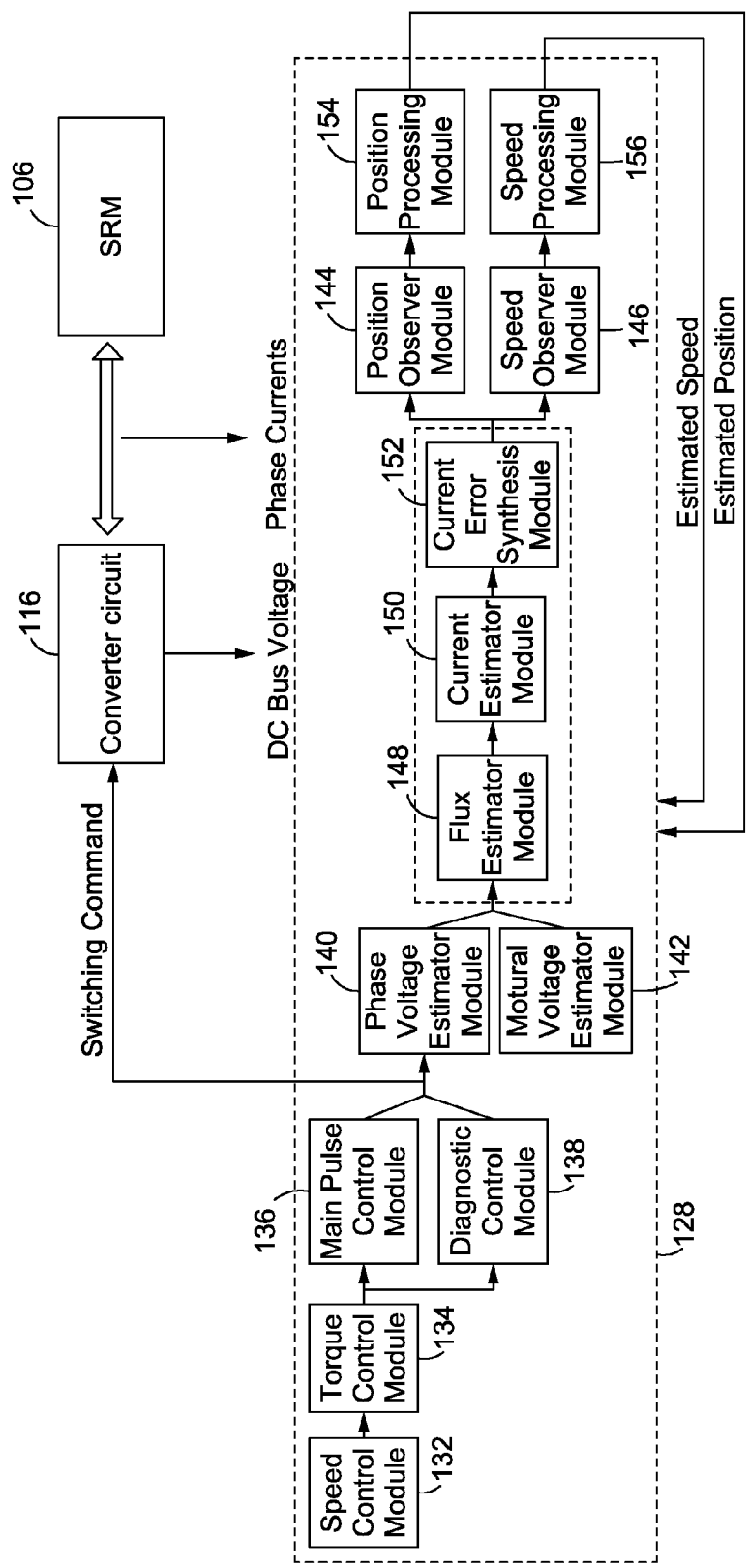
FIG. 2 is a diagrammatic view of one exemplary embodiment of a control scheme to be implemented by a controller for operating an SR machine.

As shown in FIG. 2, the controller 128 may be configured to include a speed control module 132, a torque control module 134 and a main pulse control module 136, combinations of which are often employed in conventional SR machine controls. Specifically, the speed control module 132 may be configured to determine the desired or target speed of the SR machine 106 based on any combination of operator input, machine input parameters or constraints, automated controls, and the like. In turn, the torque control module 134 may be configured to determine the target output torque of the SR machine 106, which corresponds to achieving the target speed determined by the speed control module 132. The main pulse control module 136 may be configured to generate or use the switching command, or the sequence of pulses or current signals designed to selectively enable the switches 120 of the converter circuit 116, to operate the SR machine 106 according to the target output torque or speed.

While the main pulse control module 136 may be suited for use with high speed operating modes or relatively high operating speeds of the SR machine 106, low speed operating modes or relatively low operating speeds of the SR machine 106 may be managed by a diagnostic pulse control module 138 as shown in FIG. 2. In particular, high speed operating modes may involve operating speeds that are higher than or inclusive of a nominal or base speed, while low speed operating modes may involve operating speeds that are zero or lower than the base speed. Although base speeds may vary per application, base speeds can generally be defined as the maximum speed at which the SR machine 106 is able to output constant torque and before torque output begins to decrease proportionally in relation to the operating speed.

Still referring to FIG. 2, the diagnostic pulse control module 138 of the controller 128 may be disposed in parallel to the main pulse control module 136. The diagnostic pulse control module 138 may be configured to generate and inject diagnostic or test pulses into each idle phase of the stator 112 or phases that are not controlling the SR machine 106 at a given instance. Moreover, the diagnostic pulses may selectively enable the corresponding switches 120 of the converter circuit 116 and drive a phase current with a substantially constant current height through each idle phase of the stator 112, so as to facilitate computations to be performed later. Furthermore, the diagnostic pulse control module 138 may be configured to generate and inject the test pulse into idle phases according to the most recently assessed or estimated rotor position.

As demonstrated by the architecture of the controller 128 in FIG. 2, processes that are applied to either the main pulses or the diagnostic pulses are streamlined into a single algorithm or sequence of instructions. Moreover, the entire range of operating speeds of the SR machine 106, for instance, both high speed and low speed operating modes, which previously required two or more distinct algorithms or process groups, may be managed by the unified algorithm or set of processes of FIG. 2 to not only reduce complexity, but also to spare significant computational resources. For example, either the main pulse during relatively high speed operations, or the diagnostic pulse during relatively low speed operations can be processed by the controller 128 in substantially the same manner to assess rotor position and/or rotor speed. At even higher or very high speeds, the main pulse control module 136 will likely shift between a discontinuous conduction mode (DCM) and a continuous conduction current mode (CCM) to satisfy certain power requirements. Based on the sensorless architecture and techniques disclosed herein, rotor position and speed estimation may also be possible at such high speeds and during CCM modes of operation.

To determine rotor position or rotor speed, the controller 128 of FIG. 2 may initially provide a phase voltage estimator module 140 configured to determine the voltage of the phase or phase voltage based on either the main pulse or the diagnostic pulse and known electrical properties between phase voltage and phase current for the given SR machine 106. The controller 128 may further include a mutual voltage estimator module 142 configured to determine the associated mutual voltage, for instance, with reference to one or more preprogrammed lookup tables, maps, or the like, which predefine relationships between mutual voltage values, phase current values, estimated rotor position values, and the like. Furthermore, the controller 128 may apply the phase voltage and the mutual voltage, and any suitable calculation, computation, derivation and/or manipulation thereof, as inputs to a position observer module 144 to determine rotor position and to a speed observer module 146 to determine rotor speed as shown in FIG. 2.

While other manipulations or derivations based on the phase voltage and the mutual voltage will be apparent to those of skill in the relevant art, the controller 128 of FIG. 2 may provide a flux estimator module 148 configured to determine an estimated flux based on the phase voltage and the mutual voltage. For example, the flux estimator module 148 may use known electrical properties to determine a total flux based on the determined phase voltage and to determine a mutual flux based on the determined mutual voltage. The flux estimator module 148 may then calculate the estimated flux based on a difference between the total flux and the mutual flux. As shown, the controller 128 may further employ a current estimator module 150 which determines an estimated phase current based on the estimated flux, and a current error synthesis module 152 which determines the error between the estimated phase current and one or more phase currents of the SR machine 106. The current error may then be fed into each of the position observer module 144 and the speed observer module 146 to determine the rotor position and the rotor speed, respectively.

The position observer module 144 of FIG. 2 may employ a state observer system which emulates the internal state of a real system, as well as receives input parameters and generates output parameters much like a real system. In the present case, the position observer module 144 may be configured to at least partially emulate a real SR machine 106, receive current error as input, and generate rotor position as output. While the position observer module 144 shown in FIG. 2 may be configured to determine rotor position based on current error, it will be understood that the position observer module 144 may be modified to determine rotor position using other inputs, such as the phase voltage, mutual voltage, estimated flux, phase current, or any other suitable parameter adapted by the controller 128. Optionally, the controller 128 may also provide a position processing module 154 configured to process the output of the position observer module 144 as needed to further refine and/or calibrate the estimated rotor position.

Similar to the position observer module 144, the speed observer module 146 may employ a state observer system to at least partially emulate the internal state of a real SR machine 106, receive current error as input, and generate rotor speed as output. Additionally, although the speed observer module 146 may be configured to determine rotor speed based on current error, the speed observer module 146 may be modified to employ other inputs, such as the phase voltage, mutual voltage, estimated flux, phase current, or any other suitable parameter adapted by the controller 128 to assess rotor speed. In other modifications, the speed observer module 146 may be omitted entirely, and derivations of the rotor position with respect to time may be used to determine rotor speed. However, it will be understood that such indirect estimations of rotor speed may magnify any noise or other errors untreated by the position observer module 144. Furthermore, the controller 128 may optionally include a speed processing module 156 configured to process the output of the speed observer module 146 as needed to further refine and/or calibrate the estimated rotor speed.

INDUSTRIAL APPLICABILITY

In general, the foregoing disclosure finds utility in various applications relating to switched reluctance (SR) machines or any other suitable electric machine being employed as a motor and/or generator. In particular, the disclosed systems and methods may be used to provide more efficient control of SR machines that are typically employed in association with the electric drives of power generation machines, industrial work vehicles, and other types of machines commonly used in the art. The present disclosure may also be implemented with other variable-speed drives commonly used in association with industrial and consumer product applications. The present disclosure may further be used with integrated starters, generators, or the like, commonly associated with automotive, aerospace, and other comparable mobile applications.

Figure 3:
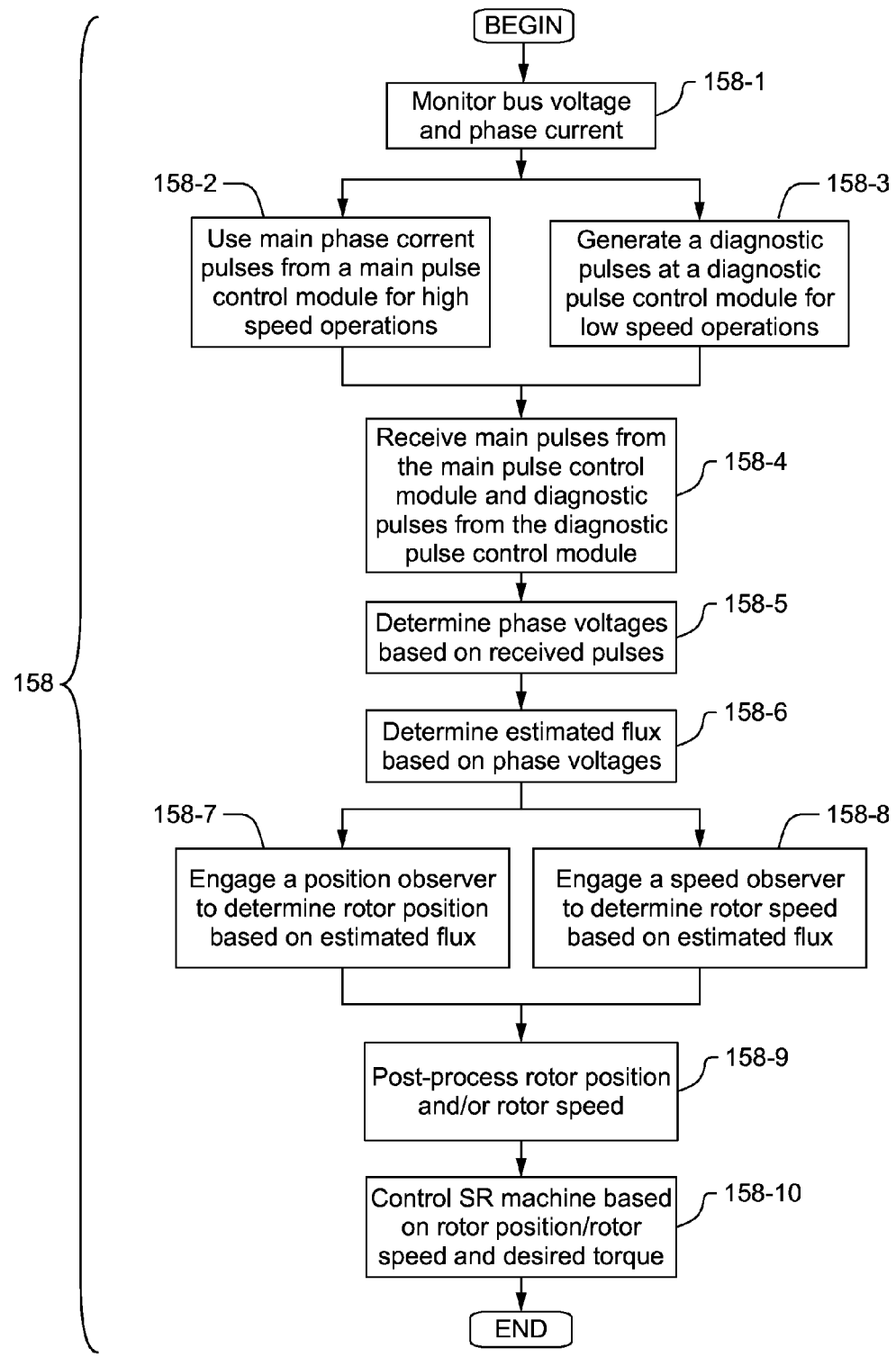
FIG. 3 is a flow diagram of one exemplary method for determining the rotor position and rotor speed of an SR machine.

One exemplary algorithm or controller-implemented method 158 for operating an SR machine 106 is diagrammatically provided in FIG. 3. As shown in block 158-1, the controller 128 may initially be configured to monitor the bus voltage or the DC link voltage of the common bus 114 and/or the converter circuit 116 associated therewith, as well as the phase current of the SR machine 106. The controller 128 per block 158-2 may further be configured to generate or use main phase current pulses, such as via the main pulse control module 136 of FIG. 2, for example, in accordance with a switching command designed to selectively enable switches 120 of the converter circuit 116 to operate the SR machine 106 according to a desired or target speed or torque. Furthermore, during low speed operations, the controller 128 according to block 158-3 may be configured to generate diagnostic pulses, such as via the diagnostic pulse control module 138 of FIG. 2. More specifically, the diagnostic pulses may be generated and injected into each idle phase of the stator 112 and designed to selectively enable the corresponding switches 120 of the converter circuit 116.

Additionally, the controller 128 according to block 158-4 of FIG. 3, may be configured receive either the main pulses or the diagnostic pulses such as via the phase voltage estimator module 140 of FIG. 2. More particularly, the controller 128 may accept the main pulses or the diagnostic pulses without discrimination and without regard to the operating mode or speed of the SR machine 106. Furthermore, the controller 128, such as via the phase voltage estimator module 140, may then be configured to determine the phase voltage associated with the received pulses according to block 158-5. The controller 128, such as via the flux estimator module 148 of FIG. 2, may additionally be configured to determine an estimated flux based at least partially on the phase voltage in block 158-6. In one example, the flux estimator module 148 may compute a total flux based on the determined phase voltage, compute a mutual flux based on a mutual voltage associated with the received pulse, and ultimately calculate the estimated flux as the difference between the total flux and the mutual flux. In alternative embodiments, the controller 128 may determine the estimated flux using other techniques known in the art.

Still referring to FIG. 3, the controller 128 may further be configured to engage a position observer, such as with the position observer module 144 of FIG. 2, to determine the rotor position based on the estimated flux according to block 158-7. As described with respect to FIG. 2, the controller 128 may determine an estimated phase current based on the estimated flux, determine the error between the estimated phase current and one or more phase currents of the SR machine 106, and use the current error as an input to the position observer to output the estimated rotor position. In other embodiments, the controller 128 and/or the position observer may employ any one of a variety of other techniques to similarly derive the estimated rotor position directly or indirectly from the estimated flux. In still further modifications, the controller 128 and/or the position observer in block 158-7 may derive the estimated rotor position based on parameters other than the estimated flux, such as the phase voltage, mutual voltage, phase current, and the like.

Furthermore, the controller 128 may be configured to engage a speed observer, such as with the speed observer module 146 in FIG. 2, to determine the rotor speed based on the estimated flux according to block 158-8. Similar to block 158-7, the controller 128 in block 158-8 may use the speed observer to emulate a real SR machine 106 and to estimate the rotor speed based on current error. The controller 128 and/or the speed observer may alternatively employ other techniques to arrive at the estimated rotor speed. In addition, as illustrated in FIG. 3, the controller 128 may also be configured to perform the functions of block 158-8 in parallel with or independently of those of block 158-7, so as to minimize any spread of corrupted data between the position observer and the speed observer. The controller 128 in block 158-9 may additionally perform any post-processing that may be needed to further refine and/or calibrate the estimated rotor position and/or rotor speed. Still further, the controller 128 in block 158-10 may be configured to control the SR machine 106 based on the estimated rotor position and/or the estimated rotor speed, as well as based on the desired torque and/or speed of the SR machine 106.

Based on the foregoing, the present disclosure provides a simplified and yet robust solution for operating an SR machine across a much wider range of operating speeds. More particularly, the present disclosure provides a control architecture which streamlines the processes used for determining the rotor position of an SR machine to conserve computational resources and excess costs associated therewith. The present disclosure also employs independent position and speed observers which naturally filter and/or correct for noise-induced errors to provide for more reliable results. The present disclosure thereby provides a sensorless solution that eliminates the need for costly position or proximity sensors without compromising performance. It will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A control system for a switched reluctance (SR) machine having a rotor and a stator, comprising:
   a converter circuit in electrical communication between the stator and a common bus; and
   a controller configured to monitor a bus voltage of the converter circuit and a phase current of the SR machine, the controller having at least a phase voltage estimator module configured to determine a phase voltage based on one or more of main pulses during high speed operating modes and any diagnostic pulses during low speed operating modes, a flux estimator module configured to determine an estimated flux based on the phase voltage and an associated mutual voltage, a position observer module configured to determine a rotor position based at least partially on the estimated flux, and a main pulse control module configured to control the SR machine based on the rotor position and a desired torque.

2. The control system of claim 1, wherein the controller further includes a speed observer module configured to determine a rotor speed based at least partially on the estimated flux.

3. The control system of claim 1, wherein the controller further includes a mutual voltage estimator module configured to determine the mutual voltage by referring to one or more preprogrammed maps defining relationships between mutual voltage values, phase current values, and estimated rotor position values.

4. The control system of claim 1, wherein the controller further includes a current estimator module configured to determine an estimated current based on the estimated flux, and a current error synthesis module configured to determine a current error based on a comparison between the estimated current and one or more phase currents of the SR machine.

5. The control system of claim 4, wherein the position observer module is configured to determine the rotor position based at least partially on the current error, the controller further including a speed observer module configured to determine a rotor speed based at least partially on the current error.

6. The control system of claim 1, wherein the controller further includes a diagnostic pulse control module configured to inject the diagnostic pulses during low speed operating modes.

7. The control system of claim 6, wherein the controller is configured to process both of the main pulses and the diagnostic pulses, and the position observer module is configured to determine rotor position for both high speed operating modes and low speed operating modes.

8. An electric drive, comprising:
a switched reluctance (SR) machine having a stator and a rotor rotatably disposed relative to the stator;
a converter circuit configured to electrically communicate with the stator and a common bus; and
a controller in electrical communication with at least the converter circuit, the controller being configured to monitor a bus voltage of the converter circuit and a phase current of the SR machine, receive main pulses and any diagnostic pulses, determine a phase voltage based on one or more of the main pulses during high speed operating modes and any of the diagnostic pulses during low speed operating modes, determine an estimated flux based on the phase voltage and an associated mutual voltage, engage a position observer to determine a rotor position based at least partially on the estimated flux, and control the SR machine based on the rotor position and a desired torque.

9. The electric drive of claim 8, wherein the controller is further configured to determine a rotor speed based at least partially on the estimated flux.

10. The electric drive of claim 8, wherein the controller is configured to determine the mutual voltage by referring to one or more preprogrammed maps defining relationships between mutual voltage values, phase current values, and estimated rotor position values.

11. The electric drive of claim 8, wherein the controller is further configured to determine an estimated current based on the estimated flux, determine a current error based on a comparison between the estimated current and one or more phase currents of the SR machine, and determine the rotor position and a rotor speed based at least partially on the current error.

12. A method for determining rotor position of a switched reluctance (SR) machine being operated through a converter circuit, comprising:
monitoring a bus voltage of the converter circuit and a phase current of the SR machine;
receiving main pulses and any diagnostic pulses;
determining a phase voltage based on one of the main pulses received during high speed operating modes and the diagnostic pulses received during low speed operating modes;
determining an estimated flux based on the phase voltage and an associated mutual voltage;
engaging a position observer to determine a rotor position of the SR machine based at least partially on the estimated flux; and
controlling an output torque of the SR machine based on the rotor position and a desired torque.

13. The method of claim 12, further determining a rotor speed based at least partially on the estimated flux.

14. The method of claim 12, wherein the mutual voltage is determined by referring to one or more preprogrammed maps defining relationships between mutual voltage values, phase current values, and estimated rotor position values.

15. The method of claim 12, further determining an estimated current based on the estimated flux, and determining a current error based on a comparison between the estimated current and one or more phase currents of the SR machine.

16. The method of claim 15, wherein the rotor position is determined based at least partially on the current error, and a rotor speed is determined based at least partially on the current error.

17. The method of claim 12, further injecting the diagnostic pulses during low speed operating modes, the rotor position for both high speed operating modes and low speed operating modes are determined by the position observer.

* * * * *